July 4, 1944. R. EHRENFELD 2,352,779
MOTOR TESTING APPARATUS
Filed Oct. 11, 1941 3 Sheets-Sheet 1

INVENTOR.
RALPH EHRENFELD
BY Donald W. Farrington
ATTORNEY

July 4, 1944.   R. EHRENFELD   2,352,779
MOTOR TESTING APPARATUS
Filed Oct. 11, 1941   3 Sheets-Sheet 2

INVENTOR.
RALPH EHRENFELD
BY Donald W. Farrington
ATTORNEY

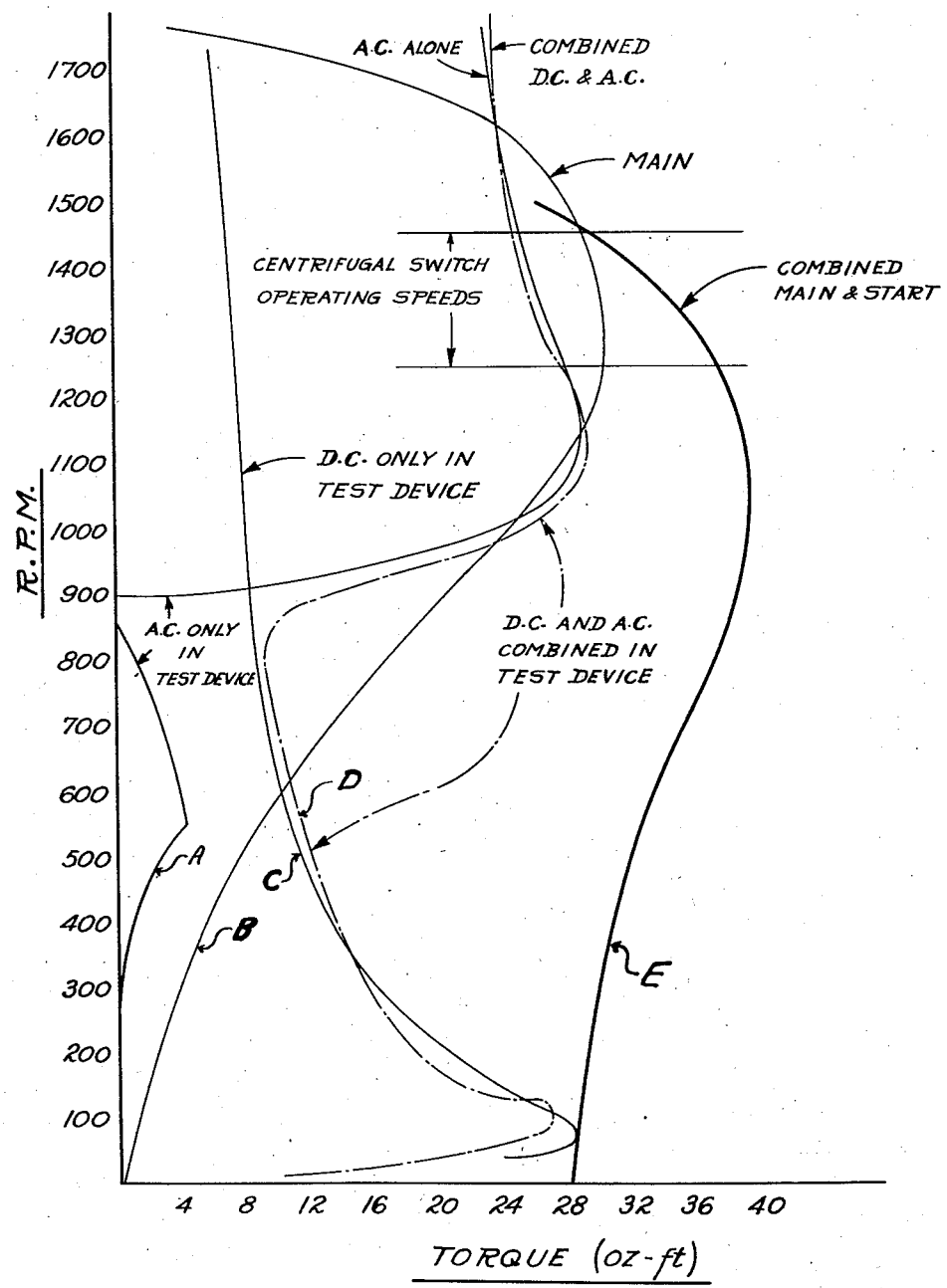

Patented July 4, 1944

2,352,779

UNITED STATES PATENT OFFICE 2,352,779

MOTOR TESTING APPARATUS

Ralph Ehrenfeld, Euclid, Ohio, assignor to The Apex Electrical Manufacturing Company, Cleveland, Ohio, a corporation of Ohio Application October 11, 1941, Serial No. 414,567

8 Claims. (Cl. 73—51)

This invention relates to test apparatus and more particularly to an improved device for testing small motors of the split-phase type.

Numerous methods and types of apparatus have heretofore been employed to test small motors of the split-phase type, such as are ordinarily used on washing machines and similar appliances. Among the prior art expedients the most common are the prony brake, dynamometer and a string or cotton sleeving method, all of which test the mechanical output ability of the motor. Such methods and apparatus require considerable handling of the motor, skilled laboratory help and involve the use of equipment and a procedure which render said methods and apparatus unsuited for high speed production purposes.

Recent improvements in the methods of manufacturing split-phase motors, such as those adapted for use on washing machines, have resulted in the adoption of an assembly-line system wherein the motors are assembled on a moving conveyor which carries the motor through its various stages of assembly. Such motor assembly conveyor is ordinarily geared to the rest of the plant operations so that the motor may progressively advance from the initial stages of assembly to its mounting upon the finished article, such as, for instance, a washing machine.

The test apparatus heretofore available, including dynamometers, brakes and the like, necessitated the removal of the motor from the conveyor, since such test apparatus was not suited for use with a motor in motion on a conveyor.

According to my invention, I propose to subject each motor to various tests while it is being carried along a moving conveyor.

It is among the objects of my invention to provide an improved method of testing a power unit such as an electric motor, gas engine or the like.

It is among the objects of my invention to provide a power unit testing apparatus which will test the mechanical output ability of the power unit so as to determine whether or not such unit possesses certain predetermined operating characteristics.

It is a further object of my invention to provide a test apparatus for an electric motor, which may be mechanically connected directly to the motor shaft, which will connect the motor to a source of energy and which will thereafter indicate whether or not said motor operates with respect to starting torque, pull out and running torque in accordance with predetermined standards.

It is a further object of my invention to provide a test apparatus according to the preceding objects, wherein an armature on the test device is mechanically coupled to the power unit shaft and direct current and alternating current fields are arranged with respect to said armature in a manner which will determine whether or not said power unit possesses certain predetermined operating characteristics.

It is a further object of my invention to provide a test apparatus for a split-phase motor which may be connected mechanically to the motor shaft and wherein a direct-current excitation and an alternating-current excitation arrangement provide a resistance to the rotation of the motor shaft which will determine whether or not said motor possesses certain starting and running torque abilities.

It is a further object of my invention to provide a method of testing split-phase motors which includes the steps of connecting the motor shaft to the armature of a dynamo electric machine and imposing alternating and direct currents to the field windings of said machine to provide torque resistance loads having peak load characteristics corresponding to the torque characteristics of the motor being tested.

It is a further object of my invention to provide a test apparatus according to the preceding objects wherein the torque resistance of the direct current arrangement is combined with the torque resistance of the alternating current arrangement so as to provide a total resistance testing the ability of the motor to start under load, to pull out the starting windings and operate satisfactorily on the main winding after said pull-out.

Other objects and advantages relating to a reduction in testing time, flexibility of control, economies in manufacture and efficiency in use will appear from the following description and the appended drawings, wherein:

Figure 3 is a graph showing the speed and torque characteristics of the apparatus and the motor being tested therein.

Figures 1, 1A:
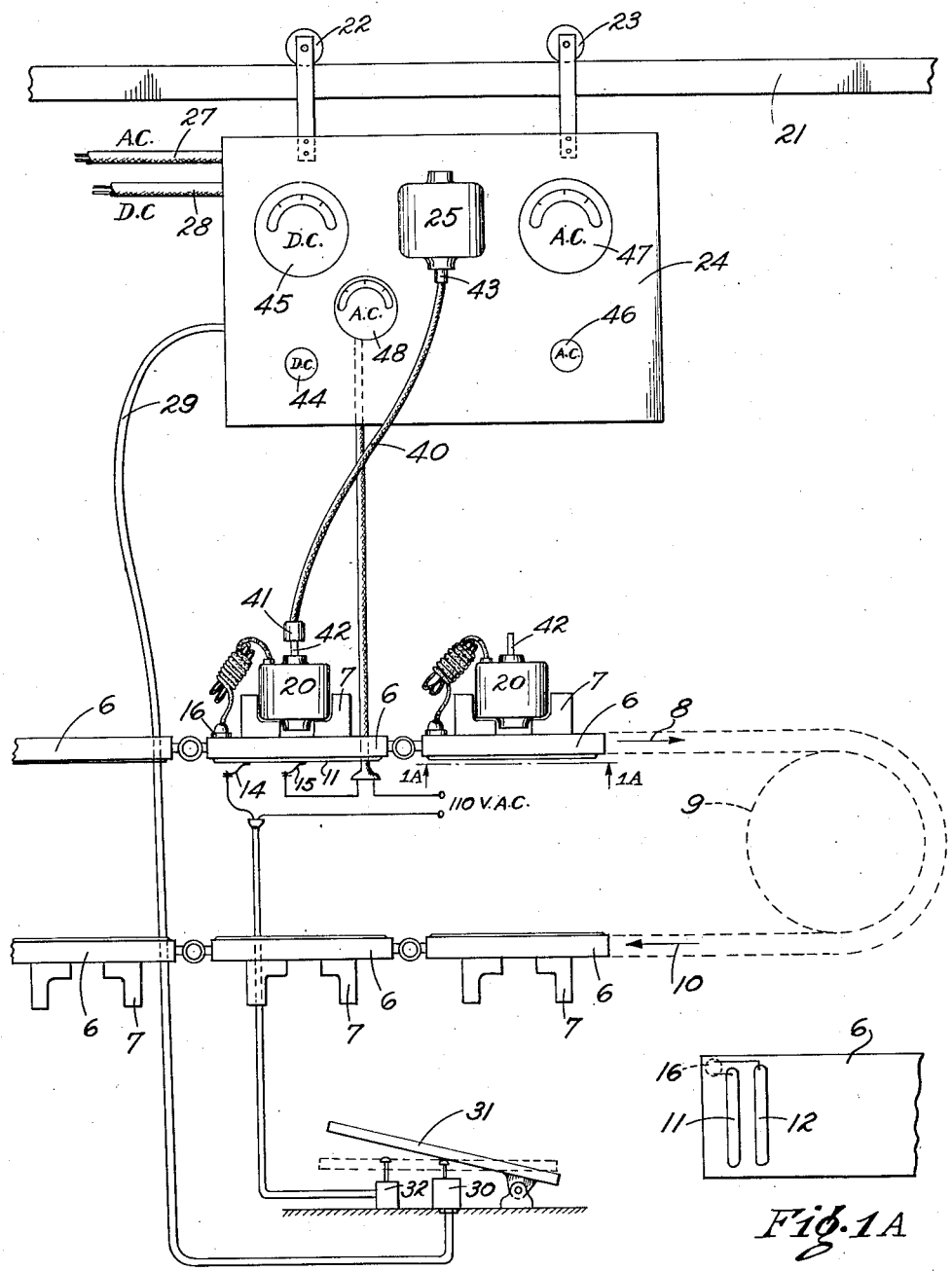
Figure 1 is an elevation showing the test apparatus made according to my invention.
Figure 1A is a plan view with parts broken away showing the under side of a motor conveyor unit.

Preferably the testing apparatus of my invention is arranged so that it may be used on a moving motor conveyor such as that shown in Fig. 1, wherein 6 indicates conveyor units, each provided with a jig or bracket 7, adapted to support a motor vertically as the same is being moved along a conveyor line.

The endless conveyor belt is made up of flexibly connected units 6 which are adapted to move in the direction indicated by arrow 8 about a drum or the like 9 and return in the path indicated by arrow 10. Each of the conveyor units 6 carries a pair of contact strips 11 and 12 on the under side thereof (see Fig. 1A) which are adapted to be carried along in the path of brush elements 14 and 15 so as to conduct electrical energy to the plug in socket 16 carried on the upper side of the conveyor unit. This arrangement provides that the motor 20 may be plugged in and run subsequent to its complete assembly on the conveyor unit 6. It is desirable to run such motors for a short time at above their rated voltage to test the motor for heating and to detect defects in the insulation of the windings. It will be understood that such high voltage tests may take place prior to the torque test to which my apparatus is particularly related and that such motors are presented for torque tests under substantially uniform temperature conditions.

An overhead track or rail 21 is arranged to support through the trolley wheels 22 and 23, a test apparatus panel 24 which carries the test unit 25 and the meters and controls for this unit. A flexible conduit or cable 27 leads to the board 24 to carry alternating current to the test apparatus and a similar cable 28 leads to the board direct current for the test apparatus. A switch cable 29 connects the test apparatus to a switch button 30 adapted to be operated by the foot pedal 31, which pedal may be mounted on the floor near the test apparatus. A second switch 32 is also operatively arranged beneath the pedal 31 and is adapted to close a circuit leading 110 volts of alternating current to the contacts 14 and 15 and thence through the bars 11 and 12 to the motor 20 undergoing test. As the motor 20 approaches the test apparatus on the conveyor line, a driving shaft member 40 may be coupled by means of chuck 41 to the vertically projecting armature shaft 42 of the motor. The upper end of the driving member 40 is connected to the armature shaft 43 of the test unit 25. It is pointed out that since the test panel 24 is supported for movement along the rail 21, a relatively rigid drive shaft connection may be established between the motor shaft 42 and test unit shaft 43, rather than the flexible drive shaft shown.

As will be understood by those skilled in the art, the split-phase motor is a single-phase induction motor equipped with an auxiliary winding, displaced in magnetic position from and connected in parallel with the main winding. For starting purposes, both the main winding 52 and auxiliary winding 53 are connected in parallel across the line as indicated in diagram 50 in Fig. 2. In series with the auxiliary winding 53 is a starting switch 51 which is designed to open at approximately 75 to 80 per cent synchronous speed. Preferably the starting switch is operated by centrifugal means and one of the important tests applied to motors of this type is the test of the ability of the combined main and starting windings to carry the rotational speed up through the centrifugal switch operating speeds.

Another important test to be applied to motors of this character is the starting torque ability. It will be understood that the main windings, alone, provide no starting torque for motors of this type and that a satisfactory motor should meet certain starting torque requirements depending upon the appliance in which the motor is used.

Referring to the graph, Fig. 3, I have shown a curve E, a speed-torque curve of a one-quarter horse-power, split-phase washing machine motor and wherein the curve E indicates the combined torque and speed characteristics obtained through the main and starting windings of the motor.

It will be observed that between zero and 100 R. P. M. the torque is about 28 ounce feet and that this torque increases gradually to a maximum at about 1000 R. P. M. and then decreases as the speed passes through the centrifugal switch operating speeds. The curve B indicates the torque of the main winding, alone. The curves B and E are characteristic of a satisfactory motor and according to my invention, I propose to provide a torque resistance for the motor that will determine whether or not a particular motor possesses such characteristics. I have obtained such torque resistance by imposing a combined alternating-current and direct-current excitation arrangement on an armature of a dynamo electric machine mechanically connected to the motor shaft. A suitable dynamo electric machine may conveniently be obtained by certain modifications of a conventional, three-phase motor. The modifications comprise connecting one phase of such machine to provide a four-pole, direct-current excitation arrangement as indicated at 35 in Fig. 2. The other two phases of the test motor are connected so as to provide an eight-pole, consequent-pole, alternating-current arrangement as indicated at 60 in Fig. 2. By using about 20 volts and 2 amperes in the direct-current excitation arrangement, a resistance to rotation of the armature of the motor to be tested (indicated diagrammatically at 35 in Fig. 2) is provided as illustrated by the curve C in Fig. 3. This provides a torque resistance of about 28 ounce feet at 100 R. P. M. and thus the ability of the motor being tested to turn the armature of the test motor up through 100 R. P. M. is evidence of satisfactory starting torque ability. By using 125 volts at 4½ amperes in the alternating-current excitation arrangement indicated at 60, a resistance as indicated in curve A of Fig. 3 is obtained. It will be observed that the resistance provided by the alternating-current excitation is negligible below 900 R. P. M., is zero at 900 R. P. M. and increases rapidly thereafter. The combined torque resistance of the alternating-current and direct-current excitation is indicated by the curve D. The combination curve D, it will be observed, provides the desired starting torque test and provides a somewhat higher torque resistance in that range of speeds at which the centrifugal switch is designed to cut out the starting winding.

It will be appreciated that the test device providing the torque resistance as above described is suited to one continuous operation which does not require any adjustments of input on the testing equipment throughout the test. Thus, the motor may be started at its rated voltage and its ability to run on through the starting torque and pull-out tests is evidence of satisfactory operation. The speed at which the individual motors may be tested is sufficiently high to accommodate motor assembly conveyor speeds and each motor coming up for test may have the same operating temperature as occasioned by previous running. This is a particular advantage as compared to the time required and motor temperature conditions attending dynamometer and prony brake tests.

Figure 2:
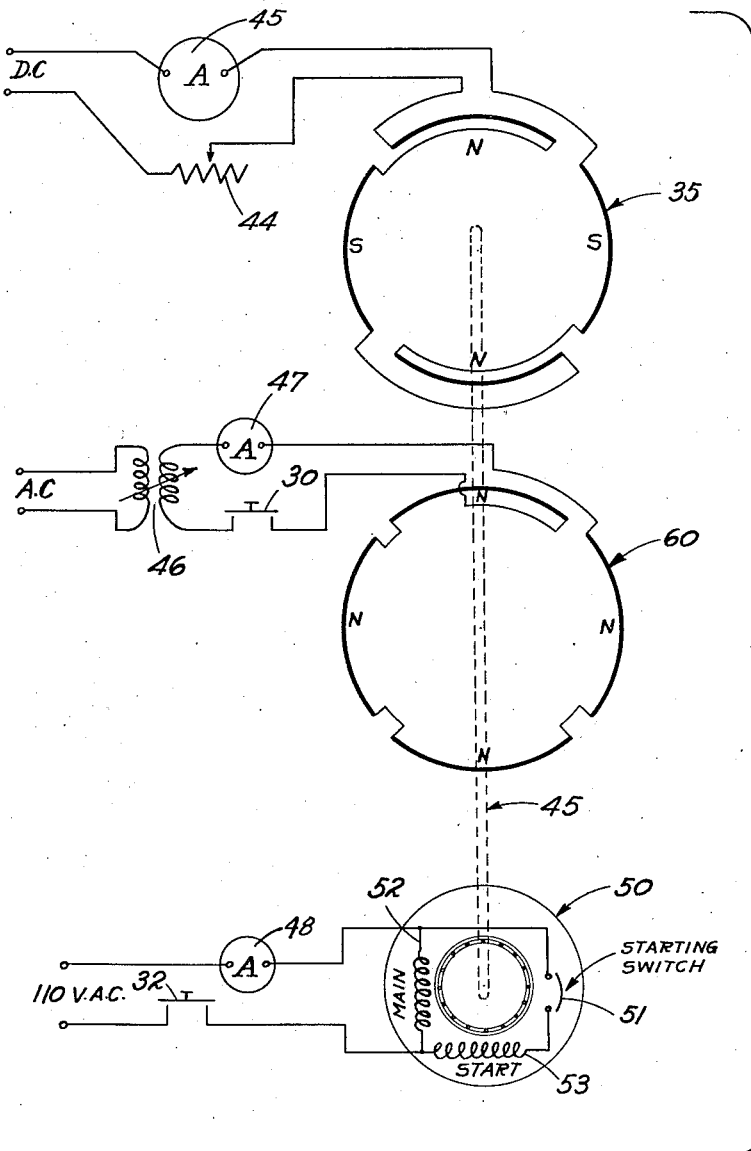
Figure 2 is a wiring diagram of the apparatus embodied in my invention.

Preferably the panel 24 is provided with a rheostat 44 in the direct-current line and an ammeter 45 to insure the proper excitation for the direct-current arrangement indicated diagrammatically at 35 in Fig. 2. The alternating-current arrangement is provided with a transformer 46 and an ammeter 47 to insure the proper excitation condition in winding indicated at 60 in Fig. 2. An ammeter 48 is connected in the 110 volt alternating-current line supplying the power for the motor to be tested and said ammeter will indicate to the operator by showing a decreased current flow that the starting winding has pulled out.

Referring to the foot pedal arrangement in Fig. 1, it will be noted that the push button switch 30 controlling the alternating-current excitation is closed before the switch 32 is closed, starting the motor 20. The alternating-current excitation for the testing device 25 is not applied to the test device 25 until the test motor 20 is ready for test so as to eliminate the tendency of the alternating current to heat the test apparatus. The delay provided by the foot pedal and switches 30—32 insures that the alternating-current excitation will be effective when the motor 20 is started.

Regarding the flexibility of the test apparatus, it will be observed that the direct-current excitation and/or the alternating-current excitation may be varied within relatively wide limits and thus variations may be obtained in the starting torque and pull-out resistance tests. For instance, in testing motors designed for a relatively high starting torque, an increase in the input to the direct-current excitation will result in a high starting torque resistance at 100 R. P. M. This increase in direct-current input, however, will not add proportionately to the combined resistance at the higher speeds where the pull-out test is made. On the other hand, increasing the alternating-current input, alone, will increase the resistance at the higher speeds without adversely affecting the combined resistance at starting. Thus I have provided a test device imposing torque resistance corresponding to the loads imposed on the motor in actual service.

Although I have shown and described one embodiment of my invention in considerable detail, it will be appreciated by those skilled in the art that variations may be made therein without departing from the scope of the invention as defined in the claims.

It will also be appreciated from the foregoing description of my invention that in the event it is desired to vary the speeds at which the pull-out resistance is supplied, that the pole arrangement may be varied. For instance, if it is desired to test a motor designed to pull out substantially above 1400 R. P. M. a six-pole alternating current excitation winding may be used. Similarly, if it is desired to test a motor designed to pull out at substantially below 1200 R. P. M., a ten or twelve-pole, alternating current excitation arrangement may be used. I am also aware that variations in the frequency of the alternating current excitation will vary the shape of the resistance curve provided by the test apparatus.

The variation of the frequency may be easily carried out while the particular power unit or motor is undergoing test and thus the test apparatus made according to my invention is well suited for the testing of internal combustion engines.

In testing the torque ability of the gas engine, I prefer that a four-pole, alternating-current arrangement be employed rather than the eight-pole as herein disclosed, for the purpose of testing an electric motor. Referring particularly to a two-thirds horse-power, gasoline engine motor of the type ordinarily employed as a power unit for domestic washing machines, I have found that such engines are designed to run at about 2250 R. P. M. under load. It would be understood that by using a four-pole, alternating-current arrangement, the alternate current windings will result in a zero resistance condition at 1800 R. P. M. and that said windings provide a maximum torque resistance at 2200 R. P. M. Thus the alternating current input in a four-pole winding would provide the desired testing resistance at about 2200 R. P. M. and that a gas engine of the type referred to will be stalled at its designed running speed by the alternating current input. The direct current arrangement may remain substantially as designed for testing an electric motor and a low torque resistance provided by the direct current input will test the ability of the gas engine to start with the gear case and cold grease condition confronted by such engines in actual use.

I claim:

1. A motor test device comprising a member adapted to be mechanically connected to the armature shaft of a motor undergoing test, means to resist the rotation of said member comprising an armature, field windings and simultaneously acting, alternating-current and direct-current excitation for said field windings, said windings and their excitation jointly acting to provide a load approaching the torque characteristics of the motor undergoing test throughout a wide range of motor speeds.

2. A power unit test device comprising a member adapted to be mechanically connected to the drive shaft of a power unit undergoing test, means to resist the rotation of said member comprising an armature, field windings and alternating-current and direct-current excitation for said field windings, the windings having said alternating-current excitation being in the form of an eight-pole arrangement, said windings and their excitation jointly acting to provide a load approaching the torque characteristics of the power unit undergoing test through a wide range of power unit speeds.

3. A motor test device comprising a member adapted to be mechanically connected to the armature shaft of a motor undergoing test, means to resist the rotation of said member comprising an armature, an alternate-pole, direct-current excitation field for said armature and a consequent-pole, alternating-current excitation field for said armature, said two excitation fields being simultaneously effective to vary the torque resistance of said member throughout the operating speeds of the motor.

4. A test apparatus for use with a motor to be tested comprising a dynamo-electric machine, means to mechanically connect the test motor shaft to said machine shaft, means to supply electrical energy to said motor, said machine having an armature and two sets of field windings, means to supply direct current to one set of windings and means to supply alternating current to the other set of windings, both of the excited windings resulting therefrom jointly acting to substantially resist armature rotation.

5. A motor testing device comprising an armature, two sets of field windings, one set of windings providing a direct-current, alternate-pole excitation, the other set of windings providing an alternating-current, consequent-pole excitation, both sets acting to provide a load approaching the torque characteristics of the motor undergoing test.

6. A motor test device comprising a shaft adapted to be mechanically connected to the armature of the motor to be tested, means to resist the rotation of said shaft comprising a direct-current, alternate-pole excitation winding and an alternating-current, consequent-pole excitation winding, means on the shaft within said windings whereby the combined effect of said excitations produces torque resistance conditions throughout the motor-operating speeds testing the starting ability and pull-out ability of the motor.

7. That method of testing a split-phase motor which comprises coupling the motor shaft to a dynamo-electric machine having an armature and two sets of field windings, effecting a direct-current excitation in one set of windings and alternating-current excitation in the other set of field windings, adjusting said alternating and direct-current excitations to provide a combined speed-torque condition in the machine corresponding to but exceeded by the speed-torque conditions of the design of the motor undergoing test, then starting the motor to determine whether or not it will come up to designed operating speed.

8. That method of testing a split phase motor which comprises coupling the motor shaft to a dynamo-electric machine having an armature and a field, effecting direct current and alternating current excitation in said field, adjusting said alternate and direct current excitation to provide a speed torque condition in the machine corresponding to but exceeded by the speed torque conditions characteristic of the design of the split phase motor undergoing test, then starting the motor to determine whether or not it will come up to designed operating speed.

RALPH EHRENFELD.